(12) United States Patent
Kim et al.

(10) Patent No.: US 8,239,048 B2
(45) Date of Patent: Aug. 7, 2012

(54) METHOD AND SYSTEM FOR ANALYZING COMPETITION RESULT

(75) Inventors: Yuwon Kim, Seongnam-si (KR); Yoon Young Jung, Seoul (KR); Youn Sik Lee, Seoul (KR)

(73) Assignee: NHN Corporation, Seongnam-si (KR)

( * ) Notice: Subject to any disclaimer, the term of this patent is extended or adjusted under 35 U.S.C. 154(b) by 290 days.

(21) Appl. No.: 12/599,921

(22) PCT Filed: May 16, 2008

(86) PCT No.: PCT/KR2008/002731
§ 371 (c)(1),
(2), (4) Date: Nov. 12, 2009

(87) PCT Pub. No.: WO2008/143430
PCT Pub. Date: Nov. 27, 2008

(65) Prior Publication Data
US 2010/0222903 A1  Sep. 2, 2010

(30) Foreign Application Priority Data
May 22, 2007   (KR) ........................ 10-2007-0049469

(51) Int. Cl.
*G06F 19/00* (2011.01)
(52) U.S. Cl. ........................................................ 700/91
(58) Field of Classification Search ............... 700/90–93
See application file for complete search history.

(56) References Cited

U.S. PATENT DOCUMENTS

| | | | | |
|---|---|---|---|---|
| 5,812,049 A | * | 9/1998 | Uzi | 340/323 R |
| 6,725,107 B2 | * | 4/2004 | MacPherson | 700/92 |
| 7,679,487 B1 | * | 3/2010 | Smith et al. | 340/323 R |
| 2008/0039165 A1 | * | 2/2008 | Harris et al. | 463/8 |

FOREIGN PATENT DOCUMENTS

| | | |
|---|---|---|
| JP | 2002-204847 | 7/2002 |
| JP | 2006-204921 | 8/2006 |
| JP | 2006-271473 | 10/2006 |
| KR | 1020030042865 | 6/2003 |

\* cited by examiner

*Primary Examiner* — Ronald Laneau
(74) *Attorney, Agent, or Firm* — H. C. Park & Associates, PLC (57) ABSTRACT

A method and system for analyzing competition results is disclosed, the method comprising providing a probability model to analyze competition results including both information about options used for a competition process, and rank information of competition participants; and determining a first parameter about a pure ability of each competition participant, and a second parameter about advantages and disadvantages of the option used for the competition process by analyzing the competition results using the probability model, wherein the first and second parameters are determined by calculating a prior distribution of the second random variable, calculating a likelihood function of the second random variable, and estimating the first and second parameter through the use of the prior distribution of the second random variable and the likelihood function. This method and system can estimate the advantages and disadvantages of the options used for the process of competition, whereby the estimated advantages and disadvantages of the options are reflected on the design of competition or the adjustment of options when designing the competition such as the game, to thereby maximize the interest in competition.

24 Claims, 7 Drawing Sheets

METHOD AND SYSTEM FOR ANALYZING COMPETITION RESULT

CROSS-REFERENCE TO RELATED APPLICATIONS

This application is the National Stage of International Application No. PCT/KR2008/002731, filed May 16, 2008, and claims priority from and the benefit of Korean Patent Application No. 10-2007-0049469, filed on May 22, 2007, which are both hereby incorporated by reference for all purposes as if fully set forth herein.

BACKGROUND OF THE INVENTION

1. Field of the Invention

The present invention relates to a method and system for analyzing competition results, and more particularly, a method and system for analyzing competition results, which is capable of analyzing a pure ability of each of competition participants based on results obtained for a competition process, and analyzing advantages and disadvantages of options used for the competition process.

2. Discussion of the Background

Recently, there are various kinds of services using computers and communication services with the development of computer industry and communication service. Game services provided through computers are widely used owing to their various types and operating methods. For example, a user of the game services may compete with other users by network or Internet.

In order to attract the user's attention and stimulate the spirit of emulation, the users are provided with a ranking calculated based on game results. That is, the users may be interested in getting the higher ranking, and further, the high-rank users may experience a feeling of accomplishment.

In addition to the game services, search services provide search results in type of ranking, so that the users can obtain desired search results with added ease. As explained above, the competition results or search results are provided in a type of ranking obtained based on the results from processes of competition using the computer and Internet.

However, it is not easy to estimate the pure ability of each of the competition participants from the ranking made based on the competition results. This is because the ranking is affected by other factors in addition to the pure ability of each competition participant. The following shows the detailed reasons.

First, it is the game-performing method. The general competition such as the game is performed by the users who are similar with their ability. In more detail, if one competent game player competes with another game player who is more competent, the competent game player can not obtain good results. In the meantime, if one incompetent game player competes with another game player who is less competent, the incompetent game player may get good results. In this case, even though the former game player is superior in pure ability to the latter game player, the latter game player gets the higher percentage of victories in comparison to that of the former game player.

Second, there are various kinds of options used for the game. In detail, even though the game players are similar in pure ability, the game player using the better option can get the good results. For example, when the two game players of the same pure ability compete with each other, let us suppose that one game player uses the superior option, and the other game player uses the inferior option. In this case, the one game player using the superior option can get the better results than the other game player using the inferior option. Accordingly, the percentage of victories in one game player using the superior option becomes higher than the percentage of victories in the other game player using the inferior option.

SUMMARY OF THE INVENTION

It is an object of the present invention to provide a system and method for analyzing competition results, which is capable of analyzing advantages and disadvantages of options used for a competition process.

It is another object of the present invention to provide a system and method for analyzing competition results, which is capable of analyzing a pure ability of each of competition participants based on results obtained for a competition process.

It is another object of the present invention to provide a system and method for analyzing competition results, which is capable of obtaining rank information about all competition participants, based on a pure ability of each of the competition participants, wherein the pure ability is estimated from the results of the competition process.

A system and method for analyzing competition results is characterized in that: the method is comprised of providing a probability model to analyze competition results, including both information about options used for a competition process, and rank information of competition participants; and determining a first parameter about a pure ability of each competition participant, and a second parameter about advantages and disadvantages of the option used for the competition process by analyzing the competition results using the probability model.

At this time, the probability model expresses a probability of generating ranks based on the rank information in terms of a probability of a first random variable defined as an ability of competition participant shown in the competition process.

Also, the first random variable is determined based on a normal distribution which has a mean corresponding to a second random variable defined as a function for a variable indicating the options, the first parameter, and the second parameter.

In one embodiment of the present invention, determining the first and second parameters comprises calculating a likelihood function of the second random variable; and estimating the first and second parameters from the second random variable to maximize the likelihood function.

In a modified embodiment of the present invention, determining the first and second parameters comprises calculating a prior distribution of the second random variable; calculating a likelihood function of the second random variable; and estimating the first and second parameter through the use of the prior distribution of the second random variable and the likelihood function. At this time, the first and second parameters are estimated by applying Bayesian Analysis to the likelihood function and the prior distribution of the second random variable in the step of estimating the first and second parameters.

Also, the first and second parameters are estimated from the approximate posterior distribution of the first and second parameters calculated from the posterior probability function of the second random variable in the step of estimating the first and second parameters.

In another aspect of the present invention, a system for analyzing competition results comprises a probability model providing unit configured to provide a probability model for analyzing competition results including information about options used for a competition process, and rank information of competition participants; and a competition result analyzing unit configured to determine first parameter about a pure ability of each competition participant, and a second parameter about advantages and disadvantages of the options used for the competition process.

In one embodiment of the present invention, the competition result analyzing unit comprises a calculating part configured to calculate a likelihood function for the second random variable; and a parameter estimating part configured to estimate the first and second parameter from the second random variable to maximize the likelihood function.

In a modified embodiment of the present invention, the competition result analyzing unit comprises a prior distribution calculating part configured to calculate a prior distribution of the second random variable by using the prior distribution of the first parameter predetermined and the prior distribution of the second parameter; a calculating part configured to calculate a likelihood function for the second random variable, and to calculate a posterior probability function of the second random variable by using the likelihood function for the second random variable and the prior distribution of the second random variable; and a parameter estimating part configured to estimate the first and second parameter from the posterior probability function of the second random variable.

At this time, the parameter estimating part calculates conditional distributions of the first and second parameter from the posterior probability function of the second random variable, and estimates the first and second parameter based on samples of predetermined size extracted from the conditional distributions by sampling.

DETAILED DESCRIPTION OF THE ILLUSTRATED EMBODIMENTS

The present invention is now understood more concretely by comparison between examples of the present invention and comparative examples. However, the present invention is not limited to such examples.

Figure 1:
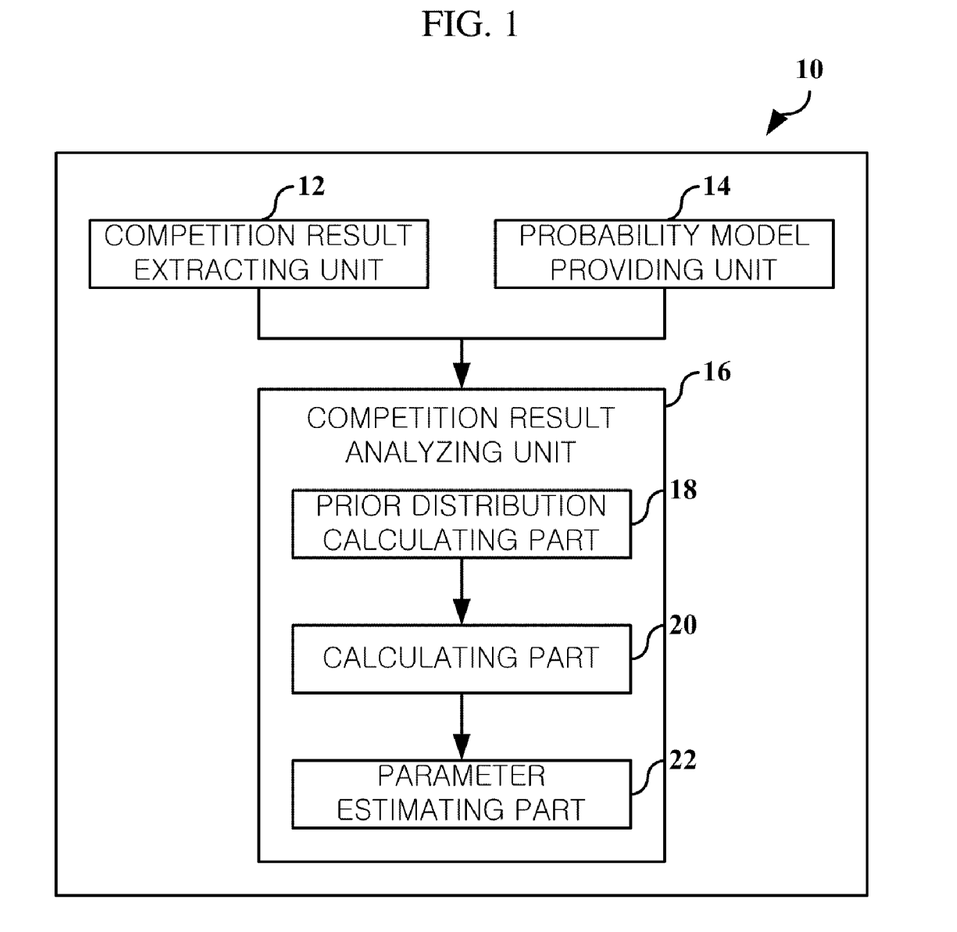
FIG. 1 is a block diagram illustrating a system for analyzing competition results according to one embodiment of the present invention.

FIG. 1 is a block diagram illustrating a system for analyzing competition results according to one embodiment of the present invention. As shown in FIG. 1, the system 10 for analyzing competition results according to one embodiment of the present invention includes a competition result extracting unit 12, a probability model providing unit 14, and a competition result analyzing unit 16. This system 10 estimates the pure ability of each of competition participants based on competition results, and also estimates advantages and disadvantages of options used for the process of competition.

In this case, the options used for the process of competition mean objects selected by the game participants for the process of game, for example items, characters, or playgrounds used for the process of competition such as games.

Hereinafter, a random variable regarding the pure ability of competition participants to be estimated is defined as a first parameter, and a random variable regarding advantage and disadvantage of options used for the competition is defined as a second parameter.

The competition result extracting unit 12 extracts the competition results generated by the process of competition from a competition result storing unit (not shown). The competition results extracted by the competition result extracting unit 12 include information about the options used for the competition, and rank information about the competition participants.

The probability model providing unit 14 provides the probability model for analyzing the competition results extracted by the competition result extracting unit 12. The probability model provided by the probability model providing unit 14 may be designed based on Probit Model.

In one embodiment of the present invention, the probability model can express the probability of generating the ranks based on the rank information of competition participants included in the competition results in terms of the probability of first random variable defined as an ability of competition participant shown in a real competition. One example of the probability model is shown in the following Math Figure 1.

$$Pr(y_g|g) = Pr(z_{(y1)g} \geq z_{(y2)g} \geq \ldots \geq z_{(yN_g)g})$$ [Math Figure 1]

The probability model shown in the math figure 1 is applied to the results obtained from competitions "G" by competition participants "K", wherein the ranking of the competitions participants is $y_g = (y_1, \ldots, yN_g)$ when the competitions are $g=1, \ldots, G$ and a set of the competition participants is $P_g$. In this case, $N_g$ denotes the size of $P_g$. Also, the first random variable which denotes the ability of the competition participant in the real competition is defined as $z_{(k)g}$, wherein $z_{(k)g}$ are the random variables by a normal distribution of the following Math Figure 2.

$$z_{(k)g} \sim N(\eta_{(k)g}, 1) \text{ for } k=1, \ldots, K$$ [Math Figure 2]

In this case, $\eta_{(k)g}$ is a second random variable defined as a function for the first and second parameters, which can be defined by the following Math Figure 3.

$$\eta_{(k)g} = \phi_k + x_{(k)g}\beta$$ [Math Figure 3]

where $\phi_k$ means the first parameter, which denotes the pure ability of each of the competition participants, β means the second parameter, which denotes the advantage and disadvantage of options used for each competition, and $x_{(k)g}$ means the variable denoting the options used for each competition.

In other words, for estimation of the first and second parameters based on the competition results obtained for the process of competition, the probability model provided by the probability model providing unit 14 can express the probability of generating the ranks based on the rank information of competition participants included in the competition results in terms of the probability of first random variables defined as the function for the first ($\phi_k$) and second (β) parameters to be estimated.

The competition result analyzing unit 16 estimates the first and second parameters using the probability model provided by the probability model providing unit 14. As shown in FIG. 1, the competition result analyzing unit 16 includes a prior distribution calculating part 18, a calculating part 20, and a parameter estimating part 22.

In one embodiment of the present invention, the competition result analyzing unit 16 can analyze the competition results by applying Bayesian Analysis to the probability model. Bayesian Analysis corresponds to one statistical method which can obtain the posterior distribution of parameter to be estimated from the prior distribution of desired parameter and the observed result. In order to analyze the probability model using Bayesian Analysis, it is necessary to define the prior distribution and likelihood function, firstly. At this time, the prior distribution is calculated by the prior distribution calculating part 18, and the likelihood function of the parameters is calculated by the calculating part 20.

The probability that the ranking is made based on the rank information of competition participants in the aforementioned probability model is defined with the probability model of the first random variable $z_{(k)g}$ whose mean corresponds to the second random variable $\eta$ including the first and second parameters to be estimated. Thus, the prior distribution calculating part 18 calculates the prior distribution of the second random variable $\eta$ including the first and second parameters. The prior distribution of the second random variable $\eta$ can be defined by the prior distribution of the first and second parameters. In one embodiment of the present invention, the prior distribution of the first and second parameters is pre-defined.

In one embodiment of the present invention, the first parameter may be determined to be a random effect. In the case of the first parameter, the number of first parameters may be considerably large in comparison with the number of competition results extracted. In order to improve the estimation efficiency, it is more advantageous to obtain an estimation result with any one value related with the first parameter, instead of obtaining the estimation result for each of the first parameters.

Accordingly, in this embodiment, the variance of the first parameter is used as any one value, and the prior distribution of the variance of the first parameter is used as any one value. The prior distribution of the first parameter and the prior distribution of the variance of the first parameter are defined by the following Math Figure 4 and Math Figure 5, respectively.

$$\phi_k \sim N(0, V_\phi), \quad V_\phi = \sigma^2_\phi I \quad \text{[Math Figure 4]}$$

$$\sigma_\phi \sim IG(a_\phi, b_\phi) \quad \text{[Math Figure 5]}$$

where IG means the inverse-gamma distribution function, $a_\phi$ and $b_\phi$ are the parameters for the prior distribution.

In the meantime, the second parameter $\beta$ corresponds to a fixed effect, wherein the prior distribution of the second parameter is defined by the following Math Figure 6.

$$\beta \sim N(0, \sigma^2_\beta I) \quad \text{[Math Figure 6]}$$

As shown in the following Math Figure 7, the prior distribution calculating part 18 calculates the prior distribution of the second random variable using the prior distribution of the variance of the first parameter and the prior distribution of the second parameter.

$$\pi(\eta) = \pi(\beta)\pi(\sigma_\phi) \quad \text{[Math Figure 7]}$$

In the probability model, the first and second parameters are newly defined in type of the second random variable. The probability distribution of the second random variable is involved with the joint probability distribution of the first and second parameters. As mentioned above, since the first parameter is determined to be the random effect, the prior distribution calculating part 18 determines the probability distribution of the second random variable using the prior distribution of the variance of the first parameter and the prior distribution of the second parameter.

Next, the calculating part 20 generates the likelihood function by the following Math Figure 8.

$$f(y \mid \eta, P_g) = \prod_{g=1}^{G} Pr(y_g \mid g) \quad \text{[Math FIG. 8]}$$

In more detail, as shown in the following Math Figure 9, the calculating part 20 provides the competition result obtained by the competition result extracting unit 12, that is, the information regarding the options and ranks, to the probability model, to thereby generate the likelihood function from the probability model.

$$\begin{aligned}
f(y \mid \eta, P_g) &= \prod_{g=1}^{G} Pr(y_g \mid g) \\
&= \prod_{g=1}^{G} Pr\left(z_{(y1)g} \geq z_{(y2)g} \geq \ldots \geq z_{(yN_g)g}\right) \\
&= \prod_{g=1}^{G} \int_{-\infty}^{\infty} \phi(z_1; \eta_{(y1)}, 1) \ldots \\
&\quad \int_{-\infty}^{z_{i-1}} \phi(z_i; \eta_{(yi)g}) \ldots \\
&\quad \int_{-\infty}^{z_{N_g-1}} \phi(z_{N_g}; \eta_{(yN_g)g}) dz_1 \ldots z_{N_g}
\end{aligned} \quad \text{[Math FIG. 9]}$$

As shown in the following Math Figure 10, the calculating part 20 calculates the entire likelihood function by multiplying the prior distribution of the second random variable with the likelihood function. Also, the calculating part 20 calculates the posterior probability function of the second random variable from the entire likelihood function according to Bayesian Analysis based on a concept that the posterior probability function of the second random variable is in proportion to the entire likelihood function.

$$f(\eta \mid y) \propto \pi(\eta) \cdot f(y \mid \eta) \quad \text{[Math Figure 10]}$$

The parameter estimating part 22 estimates the first and second parameters from the posterior probability function of the second random variable generated by the calculating part 20. In this case, the first and second parameters are estimated from the posterior probability function using Markov Chain Monte Carol (hereinafter, referred to as "MCMC").

In more detail, the parameter estimating part 22 estimates the conditional distribution of the variance of the first parameter and the conditional distribution of the first and second parameters from the posterior probability function of the second random variable. On assumption that the values of other parameters are pre-determined, the conditional distribution of the first and second parameters is estimated from the posterior probability function of the second random variable.

Accordingly, the conditional distribution of the first parameter is calculated by the following Math Figure 11, and the conditional distribution of the first parameter calculated by the Math Figure 11 is proposed in the following Math Figure 12.

$$\pi(\phi_k \mid others) \propto \quad [\text{Math FIG. 11}]$$

$$\exp\left(-\frac{1}{2}\left[\sum_{g:k \in P_g}(\phi_k - (z_{(k)g} - x_{(k)g}\beta))^2\right]\right)\exp\left(-\frac{\phi_k^2}{2\sigma_\phi^2}\right) \propto$$

$$\exp\left(-\frac{1}{2}\left[\sum_g (I_{(k \in P_g)})(\phi_k^2 - 2C_{kg}\phi_k) + \frac{\phi_k^2}{\sigma_\phi^2}\right]\right) \propto$$

$$\exp\left(-\frac{1}{2}\left[\left(N_k + \frac{1}{\sigma_\phi^2}\right)\phi_k^2 - 2\sum_g C_{kg}\phi_k\right]\right),$$

where, $C_{kg} = \begin{cases} z_{(k)g} - x_{(k)g}\beta & \text{if } k \in P_g \\ 0 & \text{otherwise,} \end{cases}$ $$N_k = \sum_g (I_{(k \in P_g)})$$

$$\pi(\phi_k \mid others) \sim N(\mu_k, \sigma_k^2), \quad [\text{Math FIG. 12}]$$
where, $$\mu_k = \frac{\sum_g C_{kg}}{N_k + 1/\sigma_\phi^2}$$

$$\sigma_k^2 = \frac{1}{N_k + 1/\sigma_\phi^2}$$

In the meantime, the conditional distribution of the variance of the first parameter is calculated by the following Math Figure 13, and the conditional distribution of the variance of the first parameter calculated by the following Math Figure 13 is proposed in the following Math Figure 14.

$$\pi(\sigma_\phi^2 \mid others) \propto \quad [\text{Math FIG. 13}]$$

$$\prod_{k=1}^{K} \frac{1}{\sigma_\phi}\exp\left(-\frac{\phi_k^2}{2\sigma_\phi^2}\right) \sigma_\phi^{-2(a_\phi+1)}\exp\left(-\frac{b_\phi}{\sigma_\phi^2}\right)$$

$$\pi(\sigma_\phi^2 \mid others) \sim IG\left(a_\phi + \frac{K}{2}, b_\phi + \frac{\sum_k \phi_k^2}{2}\right) \quad [\text{Math FIG. 14}]$$

Also, the conditional distribution of the second parameter is calculated by the following Math Figure 15, and the conditional distribution of the second parameter calculated by the following Math Figure 15 is proposed in the following Math Figure 16.

$$\pi(\beta \mid others) \propto \exp\left(-\frac{1}{2}\left[\sum_g \sum_{k \in P_g}(x_{(k)g}\beta - (z_{(k)g} - \phi_k))^2\right]\right) \quad [\text{Math FIG. 15}]$$

$$\exp\left(-\frac{1}{2\sigma_\beta^2}\beta'\beta\right) \propto$$

$$\exp\left(-\frac{1}{2}\left[\beta'\left(\sum_g \sum_{k \in P_g} x'_{(k)g}x_{(k)g} + \frac{I}{\sigma_\beta^2}\right)\beta - 2\left(\sum_g \sum_{k \in P_g} C_{(k)g}\right)\beta\right]\right)$$

-continued
where, $$C_{(k)g} = \begin{cases} z_{(k)g} - \phi_k & \text{if } k \in P_g \\ 0 & \text{otherwise} \end{cases}$$

$$\pi(\beta \mid others) \sim MN(\mu_\beta, V_\beta), \quad [\text{Math FIG. 16}]$$
where, $$\mu_\beta = \sum_g \sum_k C_{(k)g}\left(\sum_g \sum_{k \in P_g} x'_{(k)g}x_{(k)g} + \frac{1}{\sigma_\beta^2}I\right)^{-1}$$

$$V_\beta = \left(\sum_g \sum_{k \in P_g} x'_{(k)g}x_{(k)g} + \frac{I}{\sigma_\beta^2}\right)^{-1}$$

In the Math Figure 15 and Math Figure 16, $x_{(k)g}$ means the vector matrix to the options used by the competition participant k in the game g. Also, $x_{(k)g}$ means the transposed matrix, wherein the transposed matrix denotes the matrix whose columns and rows are transposed in comparison to those of the predetermined matrix.

In the Math Figure 16, the MN means the multivariate normal distribution whose mean is $\mu_\beta$ and variance is $V_\beta$.

Then, the parameter estimating part 22 obtains samples of predetermined size from the conditional distribution of the first and second parameters by the sampling process. In one embodiment of the present invention, Gibbs Sampling is used to obtain the samples of predetermined size from the conditional distribution.

Next, the first and second parameters are estimated by the samples of predetermined size obtained through the sampling process. In one embodiment of the present invention, the first and second parameters are estimated with one or more values from the mean, variance or predetermined range of the obtained samples.

Figure 2:
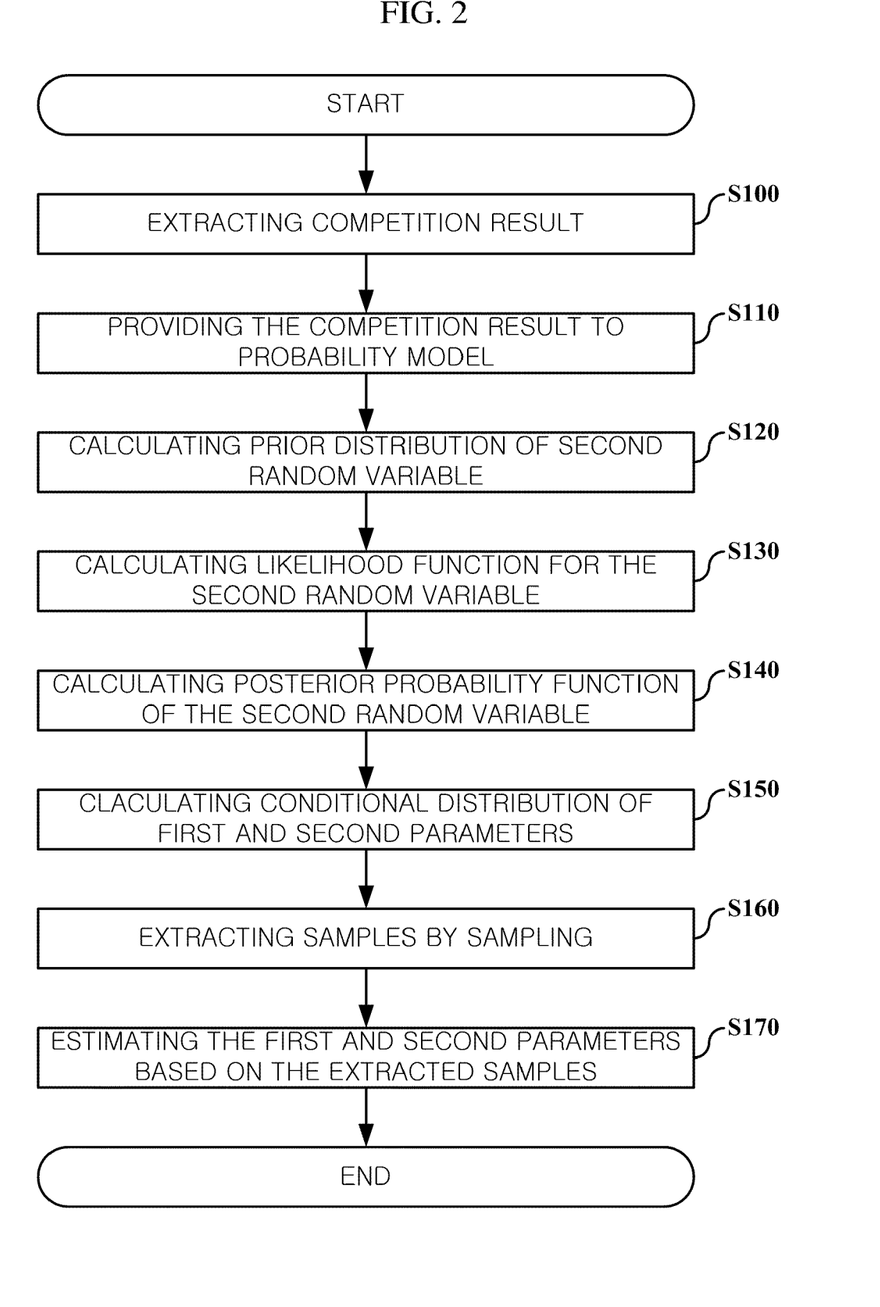
FIG. 2 is a flowchart illustrating a method for analyzing competition results according to one embodiment of the present invention.

A method for analyzing the competition result using the aforementioned system of analyzing the competition result will be explained with reference to FIG. 2.

First, the competition result including the information about the options used for the competition and the rank information about the competition participants is extracted (S100), and the extracted competition result is provided to the predetermined probability model so as to analyze the extracted competition result (S110). In this case, the probability model can express the probability of generating the ranks based on the rank information of competition participants included in the competition results in terms of the probability of the first random variable determined as the ability of competition participant shown in the competition process, as shown in the Math Figure 1. At this time, the first random variable is obtained based on the normal distribution whose mean is the second random variable defined as the function for the first and second parameters to be estimated, and whose variance is '1'. The second random variable is defined in the aforementioned Math Figure 3.

Next, the prior distribution of the second random variable is determined by the prior distributions of the first and second parameters (specifically, the prior distribution of the variance of the first parameter and the prior distribution of the second parameter) using Bayesian Analysis (S120), and the likelihood function for the second random variable is calculated from the probability model (S130). After that, the entire likelihood function is calculated by multiplying the prior distribution of the second random variable with the likelihood function, and the posterior distribution of the second random variable is calculated by the entire likelihood function (S140).

In this embodiment of the present invention, "MCMC" is used so as to estimate the first and second parameters from the posterior probability function of the second random variable calculated in S140. In more detail, the conditional distribution of the first and second parameters is calculated by the posterior distribution probability function of the second random variable (S150). The conditional distribution of the first and second parameters is determined by the Math Figure 12, Math Figure 13, Math Figure 14, Math Figure 15, and Math Figure 16. Then, the samples of the predetermined size are obtained from the conditional distribution calculated by Gibbs Sampling (S160), and the first and second parameters are estimated from the extracted samples (S170).

In one embodiment of the present invention, the mean or the variance determined from the extracted samples may be estimated as the first and second parameters, or the predetermined value determined in consideration of the mean and the variance may be estimated as the first and second parameters. Also, the value for the predetermined range may be estimated as the first and second parameters. In another embodiment of the present invention, the first and second parameters may be estimated by directly obtaining $\eta$ to maximize the likelihood functional value in Math Figure 9, without applying Bayesian Analysis.

Figure 3:
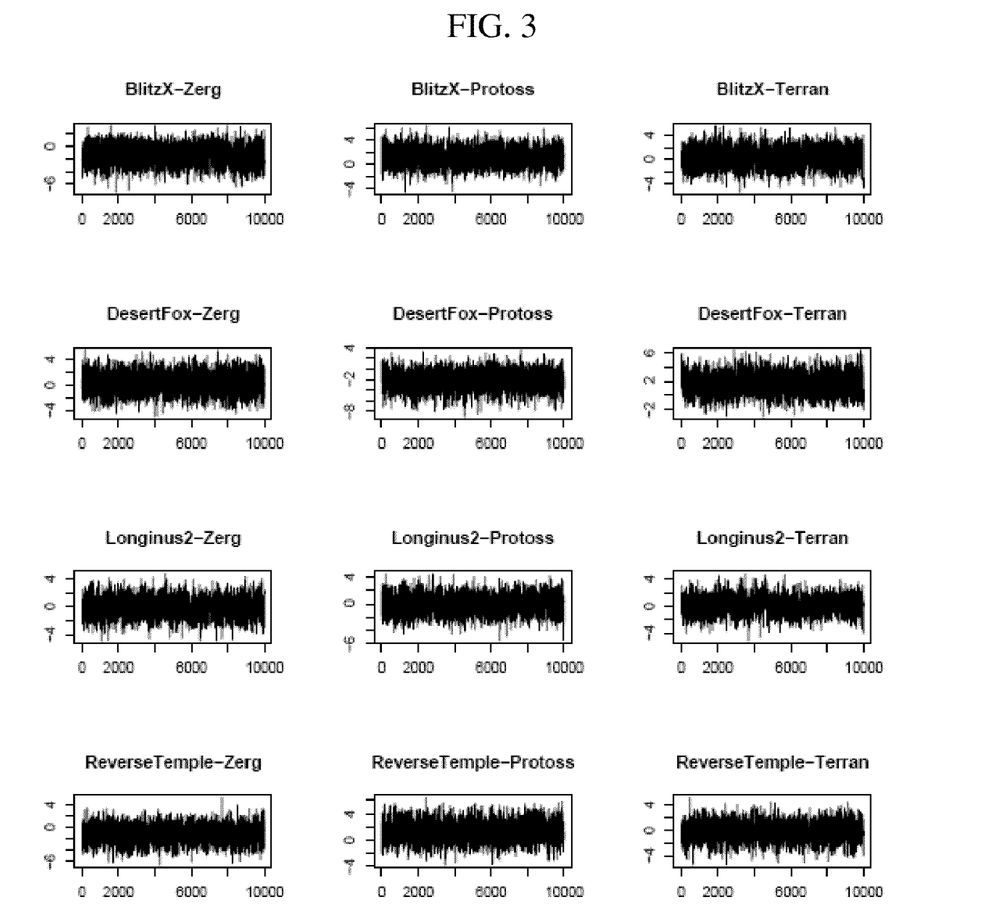
FIG. 3 is a graph illustrating β value estimated by each sample when the method for analyzing competition results shown in FIG. 2 is applied to the game "STARCRAFT"
Figure 4:
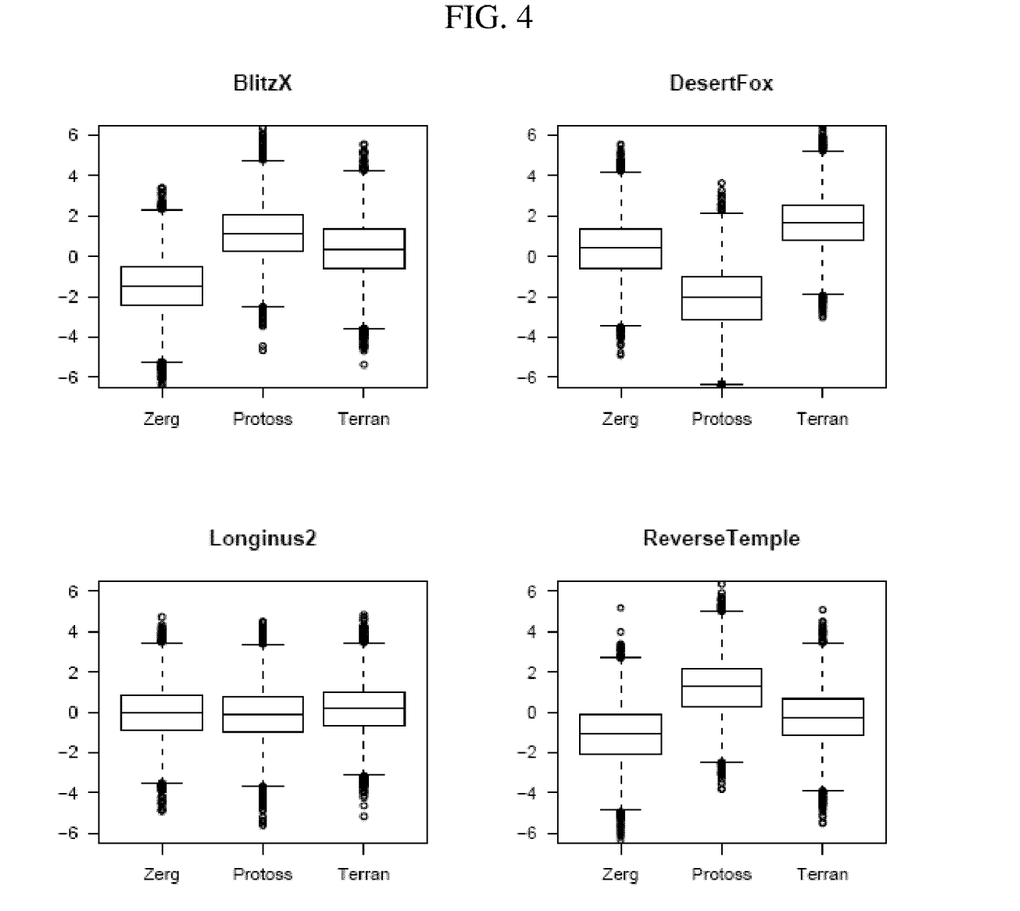
FIG. 4 is a graph illustrating a box plot for β value shown in FIG. 3.
Figure 5:
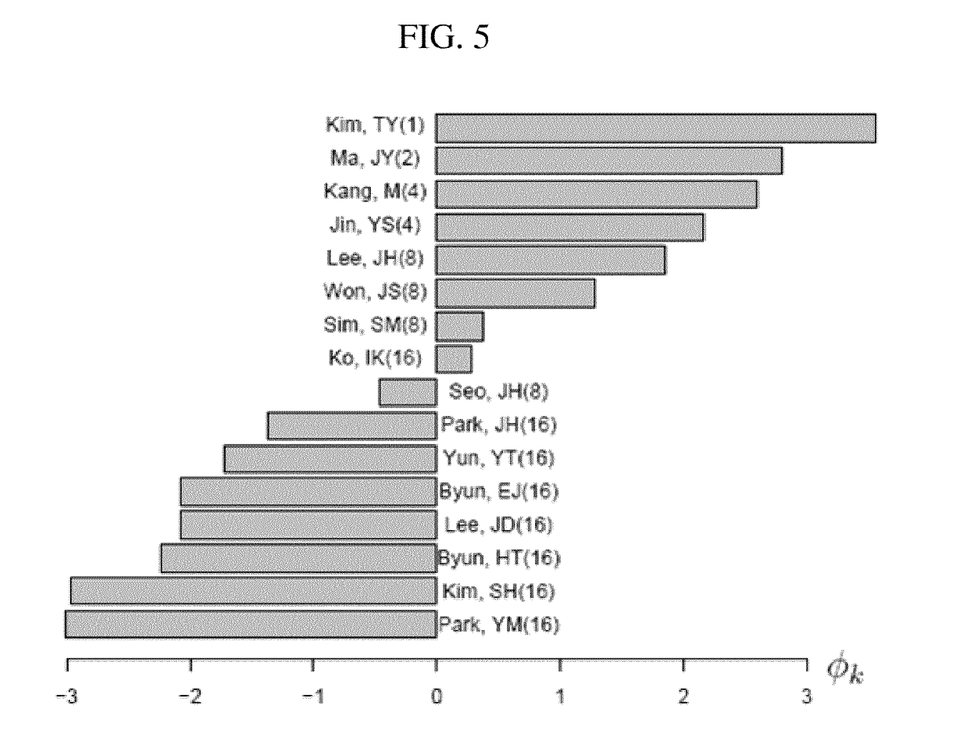
FIG. 5 is a graph illustrating $\phi_k$ value estimated when the method for analyzing competition results shown in FIG. 2 is applied to the game "STARCRAFT"

FIG. 3, FIG. 4, FIG. 5, FIG. 6, and FIG. 7 illustrate the results generated by applying the aforementioned method of analyzing the competition result. First, FIG. 3, FIG. 4, and FIG. 5 illustrate the results generated by applying the aforementioned method of analyzing the competition result to "MSL" tournament result, that is, the tournament of the "STARCRAFT" game. In this case, the "STARCRAFT" game is provided with the options of playgrounds and characters, wherein the options of playgrounds are four of "BlitzX", "DesertFox", "Longinus2" and "ReverseTemple" and the options of characters are three of "Zerg", "Protoss", and "Teran".

Accordingly, there are twelve results obtained by combining four playgrounds with three characters. Also, the random variable indicating the options has the value of '0' or '1'. In order to obtain the reasonable results, after discarding 3000 samples initially obtained by Gibbs sampling, 10,000 samples are used.

FIG. 3 illustrates the value of each sample for the second parameter $\beta$ to show advantages and disadvantages of the options used for the game and FIG. 4 illustrates the box plot for $\beta$ value shown in FIG. 3. From $\beta$ shown in the drawings, we can know that the character "Protoss" is more advantageous than other characters in the playground "BlitzX", the character "Terran" is more advantageous than other characters in the playground "DesertFox", there is little difference among the three characters in the playground "Longinus2", and the character "Protoss" is advantageous than other characters in the playground "ReverseTemple".

FIG. 5 illustrates the relation between the rank of competition participants in the game and the first parameter $\phi_k$ corresponding to the pure ability of the competition participants, estimated by the competition result analyzing method according to the present invention. In FIG. 5, each bar graph shows the value $\phi_k$ of each competition participant, and the number in parentheses shows the ranking of each of the competition participants in the game. As shown in the drawings, the ranking determined based on the pure ability estimated by the competition result analyzing method according to the present invention is similar to the ranking of the competition participants in the game.

Accordingly, the ranks of the entire competition participants can be estimated by comparing the pure ability of the competition participants obtained from some competition results without the competition of all participants.

Figure 6:
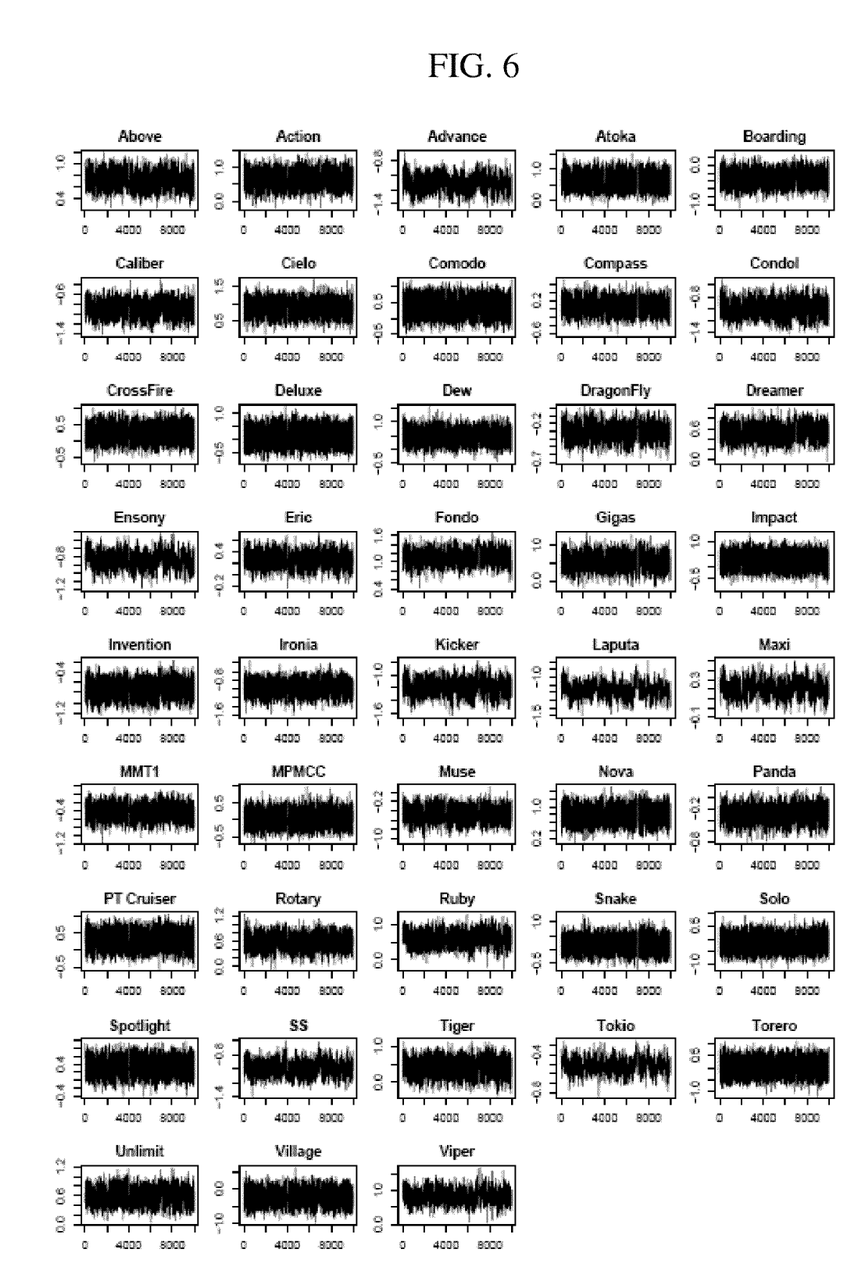
FIG. 6 is a graph illustrating β value estimated by each sample when the method for analyzing competition results shown in FIG. 2 is applied to "SkidRush" game.
Figure 7:
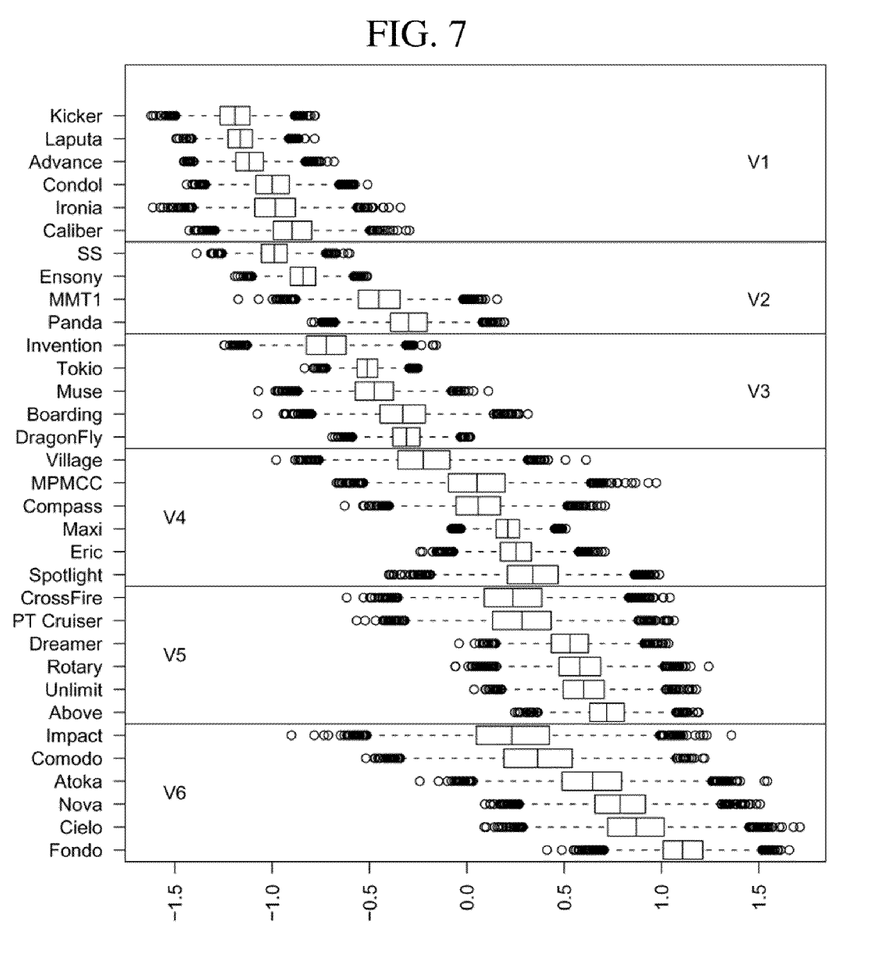
FIG. 7 is a graph illustrating a box plot for β value shown in FIG. 6.

FIG. 6 and FIG. 7 show the other competition results obtained by applying the competition result analyzing method according to the present invention. The competition results shown in FIG. 6 and FIG. 7 are the results obtained from "SkidRush" car-racing game provided by "HanGame". For the competition results provided, 4210 users played 9591 races and drive 43 models of cars. In this case, options for "SkidRush" are the models of cars selected by each participant, wherein the cars are classified into 9 grades. Herein, $\beta$ can be estimated with the competition result analyzing method according to the present invention, wherein $\beta$ shows advantages and disadvantages according to the models of cars, that is, the models of cars affect the game results.

The random variable for the model of car selected by each participant in the game may have the value "1" or "0". That is, the value "1" is allotted to the car selected by the participant, and the value "0" is allotted to the car which is not selected by the participant. After that, rank information about each participant and information about the aforementioned options are provided to a probability model. Then, the value $\beta$ estimated to show the advantages and disadvantages of the options by "MCMC" is shown in FIG. 6, and the value $\beta$ shown in FIG. 6 can be illustrated as a box plot of FIG. 7.

Referring to FIG. 7, high-ranking 12 models of cars have the large value $\beta$, that is, it shows that the high-ranking models of cars are more advantageous in the game. Accordingly, this game is intentionally designed to become more advantageous to the participant using the high-grade models of cars.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

The competition result analyzing method according to the present invention can estimate the advantages and disadvantages of the options used for the process of competition. Thus, the estimated advantages and disadvantages of the options are reflected on the design of competition or the adjustment of options when designing the competition such as the game, to thereby maximize the interest in competition.

From the competition results of one competition process, it is possible to analyze the pure ability of each participant. Accordingly, the competition result analyzing method according to the present invention can provide all competition participants with the ranking service obtained based on the pure ability of each of the competition participants. In addition, a record medium readable by a computer with a program to execute the competition result analyzing method can also provided.

Also, the competition result analyzing method according to the present invention can provide the ranking service for all competition participants even though all competition participants do not perform the competence.

The invention claimed is:

1. A computer implemented method using a processor to analyze competition results comprising:
   providing a probability model to analyze competition results comprising information about options used for a competition process, and rank information of competition participants; and
   determining, by the processor, a first parameter about a pure ability of each competition participant, and a second parameter about advantages and disadvantages of the option used for the competition process by analyzing the competition results using the probability model.

2. The method of claim 1, wherein the probability model expresses a probability of generating ranks based on the rank information in terms of a probability of a first random variable defined as an ability of competition participant shown in the competition process.

3. The method of claim 2, wherein the first random variable is determined based on a normal distribution which has a mean corresponding to a second random variable defined as a function for a variable indicating the options, the first parameter, and the second parameter.

4. The method of claim 3, wherein the second random variable is defined by adding the first parameter to the result obtained by multiplying the variable indicating the options with the second parameter.

5. The method of claim 3, wherein determining the first parameter and the second parameter comprises:
   calculating a likelihood function of the second random variable; and
   estimating the first parameter and the second parameter from the second random variable to maximize the likelihood function.

6. The method of claim 3, wherein determining the first parameter and the second parameter comprises:
   calculating a prior distribution of the second random variable;
   calculating a likelihood function of the second random variable; and
   estimating the first parameter and the second parameter by implementing the prior distribution of the second random variable and the likelihood function.

7. The method of claim 6, wherein the prior distribution of the second random variable is calculated by a predetermined probability distribution of the first parameter and a predetermined probability distribution of the second parameter.

8. The method of claim 6, wherein the first parameter and the second parameter are estimated by applying Bayesian Analysis to the likelihood function and the prior distribution of the second random variable in the estimating the first parameter and the second parameter.

9. The method of claim 6, wherein determining the first parameter and the second parameter further comprises:
   calculating a posterior probability function of the second random variable by implementing the prior distribution of the second random variable and the likelihood function, wherein the first parameter and the second parameter are estimated from the posterior probability function of the second random variable.

10. The method of claim 9, wherein the first parameter and the second parameter are estimated from the approximate posterior distribution of the first parameter and the second parameter calculated from the posterior probability function of the second random variable in the estimating the first parameter and the second parameter.

11. The method of claim 10, wherein estimating the first parameter and the second parameter comprises:
   calculating a conditional distribution of the first parameter and the second parameter by implementing the posterior probability function of the second random variable;
   extracting samples from the conditional distribution of the first parameter and the second parameter by sampling; and
   determining an estimate value of the first parameter and the second parameter from the extracted samples.

12. The method of claim 11, wherein the approximate posterior distribution of the first parameter and the second parameter are calculated by Markov Chain Monte Carol (MCMC) method.

13. The method of claim 12, wherein the samples are extracted by Gibbs Sampling method in the extraction of samples.

14. The method of claim 11, wherein the estimate value of the first parameter and the estimate value of the second parameter are determined comprising at least one of a mean, a variance, and a value within a predetermined range determined from the extracted samples in determining the estimate value.

15. A non-transitory computer-readable storage medium comprising an executable program stored thereon, which when executed by a processor, performs the following steps:
   providing a probability model to analyze competition results comprising information about options used for a competition process, and rank information of competition participants; and
   determining a first parameter about a pure ability of each competition participant, and a second parameter about advantages and disadvantages of the option used for the competition process by analyzing the competition results using the probability model.

16. A computing system to analyzing competition results, comprising:
   a probability model providing unit configured to provide a probability model to analyze competition results comprising information about options of a competition process, and rank information of competition participants; and
   a competition result analyzing unit configured to determine a first parameter about a pure ability of each competition participant, and a second parameter about advantages and disadvantages of the options for the competition process.

17. The computing system of claim 16, wherein the probability model expresses a probability of generating ranks based on the rank information of competition participants in terms of a probability of first random variable defined as the ability of the competition participant shown in the competition process.

18. The computing system of claim 17, wherein the first random variable is determined based on a normal distribution which has a mean corresponding to a second random variable defined as a function for a variable indicating the options, the first parameter, and the second parameter.

19. The computing system of claim 18, wherein the competition result analyzing unit comprises:
   a calculating part configured to calculate a likelihood function for the second random variable; and
   a parameter estimating part configured to estimate the first parameter and the second parameter from the second random variable to maximize the likelihood function.

20. The computing system of claim 18, wherein the competition result analyzing unit comprises:
- a prior distribution calculating part configured to calculate a prior distribution of the second random variable by implementing the prior distribution of the first parameter and the prior distribution of the second parameter;
- a calculating part configured to calculate a likelihood function for the second random variable, and to calculate a posterior probability function of the second random variable by implementing the likelihood function for the second random variable and the prior distribution of the second random variable; and
- a parameter estimating part configured to estimate the first parameter and the second parameter from the posterior probability function of the second random variable.

21. The computing system of claim 20, wherein the parameter estimating part is configured to estimate the first parameter and the second parameter by Bayesian Analysis method.

22. The computing system of claim 20, wherein the parameter estimating part is configured to calculate conditional distributions of the first parameter and the second parameter from the posterior probability function of the second random variable, and configured to estimate the first parameter and the second parameter based on samples of predetermined size extracted from the conditional distributions by sampling.

23. The computing system of claim 22, wherein the parameter estimating part is configured to extract the samples from the conditional distribution using Gibbs sampling method.

24. The computing system of claim 22, wherein the parameter estimating part is configured to estimate comprising at least one of a mean, a variance, and a value in a predetermined range determined from the extracted samples.

* * * * *